Oct. 25, 1927.
F. SCHAEFER
1,646,879
CLOSED LINK BRAKE HANGER
Original Filed Feb. 3, 1923
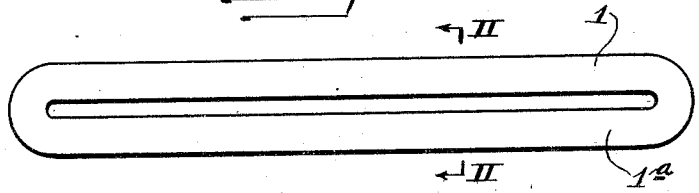
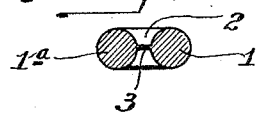 
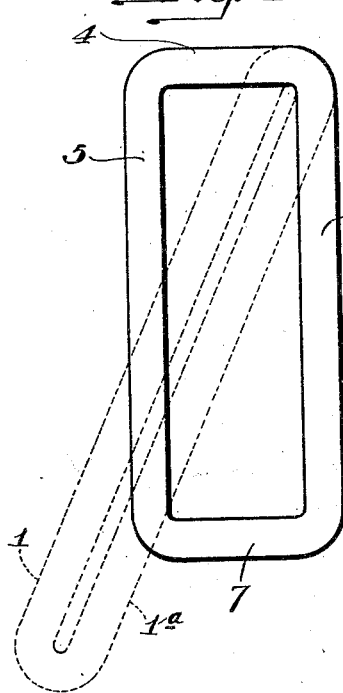 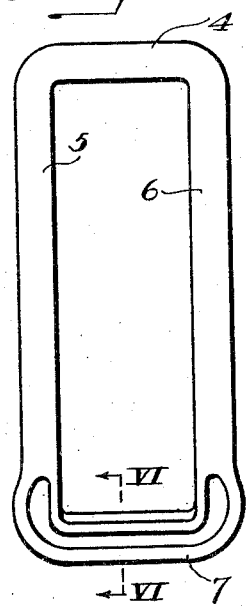 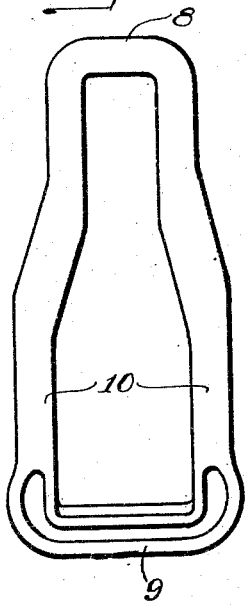
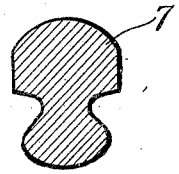
WITNESSES
INVENTOR
Frederic Schaefer
by Winter Brown & Critchlow
his attorneys Patented Oct. 25, 1927.

1,646,879

UNITED STATES PATENT OFFICE.

FREDERIC SCHAEFER, OF PITTSBURGH, PENNSYLVANIA.

CLOSED-LINK BRAKE HANGER.

Original application filed February 3, 1923, Serial No. 616,693. Divided and this application filed June 3, 1926. Serial No. 113,431.

This application is a division of my copending application Serial No. 616,693, filed February 3, 1923, pertaining to closed link brake hangers for use on railway cars to suspend brake beams from truck frames. In that application there is disclosed an improved closed link brake hanger and method of manufacturing it, the claims being directed towards the method of manufacture. In this application the claims are directed towards the improved brake hanger itself.

Brake hangers are subjected to a great variety and range of stresses, and must be as strong and durable as possible because failure of one of them is liable to drop a brake beam in front of a car wheel and cause derailment. The prevailing practice in the manufacture of closed link brake hangers is to bend a rod or bar to the desired shape and weld its adjacent ends to each other. Because of the necessity of welding, the steel of which the brake hangers have been manufactured, must be, and has been, low carbon, which cannot be hardened to effectively resist the wear to which the hangers are subjected.

The object of this invention is to provide a closed-link brake hanger which is strong, durable and highly resistant to wear.

The closed-link brake hanger provided according to this invention has two side arms and upper and lower yokes connecting the ends of the side arms. The hanger is formed of a single unwelded piece of steel which is relatively high in carbon, containing for example from about .40 to .80% carbon. The steel blank of which the hanger is formed is forged and bent by a series of steps into the desired ultimate shape and form, and when completed it is subjected to the necessary heat treatment for hardening it, with the ultimate result that there is produced a hardened brake hanger which very effectively resists the almost continuous wear to which the upper and lower yokes of the brake hanger are subjected. If made of self-hardening steel, the brake hangers may be air hardened and drawn from a suitable temperature. Otherwise they should be quenched and drawn.

By reason of the fact that the brake hanger is formed from a single piece of unwelded steel, it does not have a plane of potential weakness, such as is characteristic of prior brake hangers, and which has been responsible for serious accidents due to breakage of the hangers at their weld points; and by reason of the fact that the brake hanger is formed of relatively high carbon steel it is capable of taking and maintaining a hardened form which resists wear of its upper and lower yokes, and materially prolongs its life.

The improved brake hanger is illustrated in the accompanying drawings which also show the several successive steps in the course of its manufacture. In these drawings Fig. 1 is a plan view of a steel blank after the first forging operation has been performed upon it; Fig. 2 a transverse sectional view taken on the line II—II, Fig. 1; Fig. 3 a view corresponding to Fig. 2 after another operation has been performed upon the blank; Fig. 4 a plan view of the hanger after a still further step has been performed upon the blank, the blank of Figs. 1 and 3 being indicated in dotted lines; Fig. 5 a view of one form of the finished brake hanger; Fig. 6 a transverse sectional view of the lower transverse yoke of the hanger, the plane of view being indicated by the line IV—IV, Fig. 5; and Fig. 7 a plan view of another form of finished brake hanger.

In the first step of the manufacture of the brake hanger, an integral steel rod or bar of any suitable or desired cross-sectional shape is forged into the form of an elongate closed link having two sides 1 and 1ª with an intermediate narrow slot 2 between them, as shown in Fig. 1. Usually there is a thin web 3 between the sides 1 and 1ª after the forging operation, which web may be readily stamped cut or otherwise removed so that the blank will have a completely open slot as shown in Fig. 3.

The elongate link of Fig. 1 is subjected to an expanding operation in which the sides 1 and 1ª form the transverse yokes and side arms of the hanger. This may be accomplished by forcing the elongate blank of Figs. 1 and 3 over a suitably shaped expanding tool. When the final brake hanger is of truly rectangular form, such as illustrated in Fig. 4, the sides of the elongate link are preferably so expanded that each side 1 and 1ª forms one transverse yoke and one side arm of the hanger. In Fig. 4 the elongated link illustrated in dotted lines is so expanded that the side 1 forms the transverse upper yoke 4 and the side arm 5 of the hanger, and the side 1ᵃ forms the side arm 6 and transverse yoke 7 of the hanger.

The lower transverse yoke may be subjected to a forging operation to give it any desired shape, as for example to bring it into the shape of an asymmetric I-beam, as illustrated in Figs. 5 and 6, this particular form of lower yoke being disclosed and claimed in my United States Patent No. 1,470,121.

As an example of other than truly rectangular forms of closed link brake hangers embodying my invention, there is illustrated in Fig. 5 a brake hanger in which the upper transverse yoke 8 is shorter than the lower yoke 9, the sides 10 being off-set inwardly intermediate of their ends.

In the closed-link brake hanger shown in Figs. 5 and 7, and in any other specific form which may be made embodying the invention, each hanger is formed of a single piece of unwelded relatively high carbon steel, and is hardened by a suitable heat treatment to effectively resist wear. In actual practice it has been found that brake hangers embodying this invention may, because of their wear-resisting properties, be used more than twice as long as those heretofore produced, and in no instance has a brake hanger embodying this invention failed by reason of an inherent plane of weakness.

I claim as my invention:

1. A forged closed-link brake hanger consisting of two side arms and upper and lower yokes connecting the ends of the side arms, the entire brake hanger being formed of a single unwelded piece of relatively high carbon steel and hardened to resist wear.

2. A forged closed-link brake hanger consisting of two side arms and upper and lower yokes connecting the ends of the side arms, the entire brake hanger being formed of a single unwelded piece of steel containing from about .40 to .80% carbon and hardened to resist wear.

In testimony whereof, I sign my name.

FREDERIC SCHAEFER.